Sept. 1, 1931. R. H. OWENS 1,821,895
FLUID HANDLING APPARATUS
Filed July 31, 1926

Inventor
Robert H. Owens
By Maréchal and Fehr
Attorneys

Patented Sept. 1, 1931

1,821,895

UNITED STATES PATENT OFFICE

ROBERT H. OWENS, OF CONNERSVILLE, INDIANA, ASSIGNOR, BY MESNE ASSIGNMENTS, TO INTERNATIONAL-STACEY CORPORATION, OF COLUMBUS, OHIO, A CORPORATION OF OHIO

FLUID HANDLING APPARATUS

Application filed July 31, 1926. Serial No. 126,318.

This invention relates to fluid handling apparatus, and particularly to a fluid meter.

One of the principal objects of this invention is to provide apparatus of this character, in which the rotary members are supported in bearings which are constructed to prevent the passage therethrough of objectionable foreign matter.

Another object of the invention is to provide apparatus of this character, comprising rotary members cooperating with the fluid passing through the apparatus, which are supported in bearings, and provided with means for balancing pressures upon opposite sides of the bearings to prevent passage into the bearings of objectionable foreign matter.

Other objects and advantages of the present invention will be apparent from the following description when taken in connection with the accompanying drawings.

Figure 1:
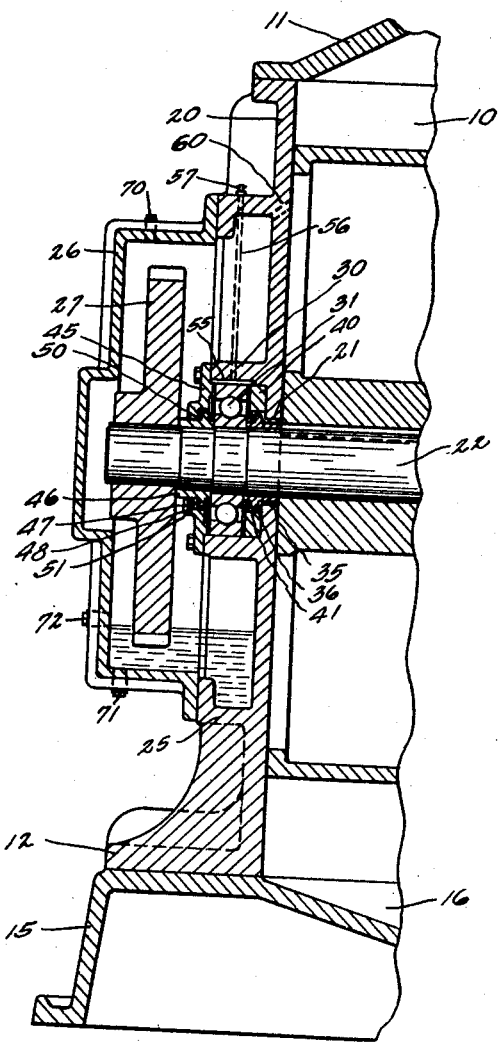
Figure 2:
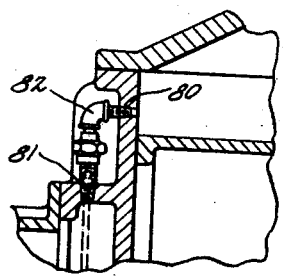

In the drawings in which like characters of reference designate like parts throughout the several views thereof, Fig. 1 is a vertical sectional view through apparatus constructed in accordance with this invention; and Fig. 2 is a fragmentary sectional view of a slightly modified embodiment of the invention.

The device shown in the drawings as illustrating a preferred embodiment of the invention is of the well-known rotary lobed impeller construction of the widely known "Roots' blower" type, and as disclosed is particularly adapted for the metering of gases. And the invention is described with particular reference to a gas meter, although of course the invention is not necessarily thus limited in scope.

With many gases, such for instance as ordinary city gas, the amount of objectionable impurities in the gas is quite small. However, with some gases, such for instance as coke-oven gases, a considerable quantity of tar, coke breeze and the like, is present in the gas, and these impurities tend to work into the bearings of the meter and wear them out very rapidly. But with the construction shown, as embodying this invention, this objectionable condition will not arise; for means is provided for balancing pressures across the bearings so that there is no particular tendency for impurities to work into the bearings from the gas passing through the meter. In addition means is provided for supplying grease under pressure to the bearings, which grease tends to work out of the bearings in both directions and thus prevents impurities from working into the bearings.

As shown in the drawings the meter comprises an impeller casing, designated generally by the numeral 10. This casing, as is well understood, is generally of elliptical cross section, and has an opening at the top adapted to receive a top or cover 11 which is in turn adapted for connection in any suitable manner to a gas supplying pipe, not shown. The casing 10 also has an opening at the bottom which is surrounded by a flanged portion 12. This flanged portion 12 is adapted to set upon a base member or bed plate 15, which has a suitable outlet passage 16 therein which connects with the lower opening of the casing, the impeller casing and base member being connected together by means of bolts or in any other suitable manner. This passage 16 is adapted for connection to the gas delivery pipe, and preferably the gas flows through the meter in a downward direction, although this may be varied if desired. However, by having the gas flowing downwardly impurities are more readily carried through the meter and not deposited therein with possible resulting trouble. The impeller casing 10 is open ended, and each end is provided with a head or end plate 20, each end plate being provided with two openings 21, each adapted to receive a shaft end. The openings 21 in the two end plates are placed in alignment in pairs, to receive aligned shaft ends, each pair of shaft ends supporting a lobed impeller which is rotatably supported within the impeller casing. In the device illustrated these impellers are of the conventional lobed type, and their construction therefore need not be shown. Each impeller is mounted upon a shaft 22 which extends through the waist of the impeller and has its opposite ends extending through two cooperating aligned passages 21. For purposes of this description only one end of the meter is shown; but this is all that is needed for an adequate disclosure of the present invention.

As shown the end plate 20 is provided with an outwardly extending flange 25, which is adapted to receive in gas tight contact, a cover plate 26. The cover plate may be attached to the flange 25 in any suitable manner, as by means of bolts in the conventional way. This cover plate encloses the extended end of the shaft 22, providing an externally gas-tight chamber. Mounted upon the outer end of each shaft 22, within the said chamber is a timing gear 27, which may be fixed upon the shaft in any suitable manner. Timing gears may be provided at only one end of the meter, or if desired at both ends of the meter. Preferably timing gears are provided at both ends the gears being arranged in pairs to intermesh, and the two gears of each pair are cut to have blacklash, and mounted with the teeth set against each other to compensate for this blacklash. This construction has been found to give very quiet running gears, and permits of securing such quiet running gears without the necessity of excessively nice manufacture.

Surrounding each opening 21 is an outwardly extending flange 30, within which is mounted a ball bearing 31, the outer race of the bearing being suitably mounted within this circular flange 30, and the inner race being mounted upon the extended end of the shaft 22. Positioned within the opening 21, and mounted upon the shaft 22 is a sleeve 35, having a circular rib or flange 36 thereon. This sleeve 35 is of such width that when assembled one end will bear against the inner race of the ball bearing and the other will be pressed into contact with the end of the impeller within this impeller casing. Within the circular bearing receiving chamber, within the circular flange 30, is a ring 40, which is counter sunk around its bore, as designated by the numeral 41 to loosely received the rib or flange 36, the bore of this ring being such that it also loosely receives the end of the sleeve 35 which is adjacent the bearing.

Bolted to the outer face of the flange 30 is a cover plate or ring 45, the bore of which is of sufficient size to loosely receive a sleeve 46, mounted upon the end of the shaft 22, outwardly of the ball bearing. This sleeve 46 is substantially identical in construction with the sleeve 35, and is provided with a circular rib or flange 47, corresponding to the rib 36. The cover or ring 45 is also counter sunk around its bore to loosely receive the rib 47, as indicated by the numeral 48. In addition the ring 45, is provided, in the wall of the bore therethrough, with a groove 50 which is connected at the lower part of the ring 45 with a passage 51 which acts as a drain passage to permit the escape therethrough of material collecting within the groove 50.

At substantially its uppermost point the flange 30 is provided, in the inner wall thereof, with a groove 55, which is connected by means of a suitable grease passage 56 to a grease connection 57, which connection is adapted to receive a grease gun, so that heavy grease under pressure may be forced through the passage 56 into the groove 55, to fill the space within the flange 30 with grease under pressure. The various sleeves and parts described as being disclosed within the flange 30 are so arranged that a somewhat tortuous passage is provided, through which the grease introduced through the passage 56 must pass in escaping from within the flange 30. Grease being supplied under pressure into the space within the flange 30 surrounding the bearing, this grease tends to work out of this space in both directions. As a result impurities present in the gas being metered, and tending to pass into the bearing will be caught by this outwardly flowing grease and will be prevented from entering the space surrounding the bearing. As shown the impeller is formed to have a close running fit with the end plate which in turn provides only a narrow channel or passage through which grease may leak from within the flange to the interior of the impeller casing, which tends to increase the effectiveness of the apparatus. The end plate of the impeller adjacent the upper end of the grease and bearing housing casing is provided with a passage 60, which connects the interior of the gear and bearing housing chamber with the interior of the impeller casing. The section of Fig. 1 is taken through one of the impeller shafts, and since two impellers are ordinarily provided in a device of this character, this section is to one side of the vertical center line of the apparatus. The passage 60 is located substantially along the vertical center line of the impeller casing and therefore is out of the path of travel of each impeller. If this were not true difficulties might be encountered for if one of the impellers wiped over the inner end of the passage 60 it would tend to clog the inner end of the passage with impurities deposited from the gas within the impeller casing. Not only does the introduction of grease under pressure within the bearing receiving space inside the flange 30 prevent the passage of impurities into that space, because of collecting in the escaping grease any impurities which tend to pass within this space so that the impurities tend to pass outwardly and away from the bearings, but by connecting the interior of the bearing housing chamber with the interior of the impeller casing the pressure across the bearing is balanced, and consequently there is no tendency for the impurities to be forced from the impeller casing through the bearing into the gear housing.

Preferably the lower portion of the gear housing chamber is filled with oil, sufficiently to immerse a portion of the timing gear 27. This is for purposes of lubrication. This oil may be introduced through the plugged filling opening 70, and may be withdrawn from time to time as desired through the plugged drain opening 71. A plugged opening 72 is provided for determining and controlling the oil level.

During operation grease will tend to work both ways from the bearing, along the shaft 22. Such excess grease as passes into the impeller casing will flow to the bottom of the casing, and perhaps flow outwardly with the gas, and may be collected in any suitable way. Such grease as flows toward the outer end of the shaft 22 will pass into the groove 50 and will escape therefrom through the passage 51. Such excess grease will drop into the bottom of the gear housing chamber and mix with the lubricating oil therein. And from time to time the mixture of oil and grease can be withdrawn and the oil replenished. It is to be noted too that on each side of the bearing a rib is provided on the shaft which cooperates with a groove in the surrounding structure. These two oppositely positioned ribs rotate with the shaft, and due to centrifugal action tend to throw off into the cooperating grooves any grease which tends to flow past the ribs. As a result the grease thrown off by these ribs, under the centrifugal force, will tend to collect in the cooperating grooves and form a definite oil seal, which is under substantial pressure, and therefore quite positively prevents the passage of impurities through these grooves into the bearings.

In Fig. 2 is shown a slightly modified form of construction in which a passage 80 is provided in the end plate and a passage 81 in the wall of the gear housing chamber, these two passages being connected by means of a pipe 82 which is arranged externally of the impeller casing. In some forms of apparatus the construction is such that a passage arranged, like the passage 60 shown in Fig. 1, within the end plate may not be conveniently used. In such circumstances a passage such as shown in Fig. 2 may be employed.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a fluid handling apparatus, a casing having a fluid passage therethrough, a rotor shaft mounted within said casing and adapted to cooperate with the fluid passing therethrough, an end-plate closing the end of said casing and having a rotor shaft receiving opening therein, a bearing for said rotor shaft mounted on the exterior of said end plate adjacent said rotor shaft receiving opening, and a housing cooperating with said end plate to form a chamber receiving said bearing, said end plate having a passage therethrough independent of said rotor shaft receiving opening providing connection between said casing and said bearing receiving chamber.

2. In a fluid handling apparatus, a casing having a fluid passage therethrough, a rotor member mounted within said casing and adapted to cooperate with the fluid passing therethrough, an end plate closing the end of said casing, an antifriction bearing for said rotor member mounted on the exterior of said end plate and having inner and outer members arranged to form a tortuous passage, means through which lubricant may be supplied under pressure to said bearing, and a housing cooperating with said end plate to form a chamber receiving said bearing, and a pressure equalizing passage located at a point remote from said bearing opening at one end into the casing and at the other end into said chamber for equalizing the pressures within said chamber and said casing to diminish the tendency for leakage of fluid from said casing into the bearing.

3. In a fluid meter of the character described, a casing, a rotor member mounted within said casing and adapted to cooperate with the fluid passing therethrough, an antifriction bearing for supporting said rotor accessible on one side to the fluid passing through the casing, means through which lubricant may be supplied to said bearing, said bearing having means at opposite ends thereof restricting flow of lubricant from said bearing and means for balancing the pressures on said side of said bearing and the pressure on the opposite side thereof to prevent any substantial leakage of fluid from the casing into the bearing.

4. In a fluid handling apparatus, a casing having a fluid passage therethrough and having a rotor shaft receiving opening therein, a rotor member mounted within said casing and adapted to cooperate with the fluid passing therethrough, a bearing for supporting said rotor positioned on the exterior of said casing adjacent said rotor shaft receiving opening, a housing enclosing said bearing and forming a bearing receiving chamber, and a fluid passage at a point remote from the bearing for equalizing the pressures within said bearing receiving chamber and the higher pressure side of said casing respectively to diminish the tendency for the passage of fluid from said casing into the bearing.

In testimony whereof I hereto affix my signature.

ROBERT H. OWENS.